US011819951B2

(12) United States Patent
Olson et al.

(10) Patent No.: US 11,819,951 B2
(45) Date of Patent: Nov. 21, 2023

(54) RESISTANCE SOLDERING SYSTEM

(71) Applicant: Antaya Technologies Corporation, Warwick, RI (US)

(72) Inventors: Gordon Olson, Norton, MA (US); Michael E. Wheaton, W. Warwick, RI (US); William Falk, Warwick, RI (US)

(73) Assignee: Aptiv Technologies AG, Schaffhausen (CH)

( * ) Notice: Subject to any disclaimer, the term of this patent is extended or adjusted under 35 U.S.C. 154(b) by 172 days.

(21) Appl. No.: 17/148,925

(22) Filed: Jan. 14, 2021

(65) Prior Publication Data

US 2021/0129249 A1     May 6, 2021

Related U.S. Application Data

(63) Continuation of application No. 16/012,919, filed on Jun. 20, 2018, now Pat. No. 10,926,346.

(51) Int. Cl.
*B23K 3/08*     (2006.01)
*G05B 19/042*     (2006.01)

(52) U.S. Cl.
CPC .............. *B23K 3/08* (2013.01); *G05B 19/042* (2013.01); *G05B 2219/23345* (2013.01); *G05B 2219/25252* (2013.01)

(58) Field of Classification Search
CPC .... B23K 3/033; B23K 1/0004; B23K 3/0392; B23K 3/08; G05B 19/042
See application file for complete search history.

(56) References Cited

U.S. PATENT DOCUMENTS

| 2,790,059 A | 4/1957 | Burnett |
| 2,969,449 A | 1/1961 | Tyler |
| (Continued) |

FOREIGN PATENT DOCUMENTS

| CA | 783737 A | 4/1968 |
| CN | 1119572 A | 4/1996 |
| (Continued) |

OTHER PUBLICATIONS

Japanese Office Action based on JP Application No. 2019113299, dated Apr. 16, 2021, 4 pages.
(Continued)

*Primary Examiner* — Thien S Tran
(74) *Attorney, Agent, or Firm* — Billion & Armitage

(57) ABSTRACT

A resistance soldering system includes a power input receiving an alternating current from a power source and a controller circuit generating a control signal indicative of a desired power level delivered for a desired time. The resistance soldering system further includes a silicon-controlled rectifier connected to the power input and the controller circuit and producing a control voltage proportional to the control signal and a transformer having a primary side receiving the control voltage and a secondary side having output leads configured to apply an output voltage to a solder joint disposed between the output leads. The controller circuit determines the control signal applied to the silicon-controlled rectifier required to melt the solder joint based on the desired power level and the desired time. The controller circuit controls the desired power level independent of the desired time. A method of operating a resistance soldering system is also presented.

18 Claims, 5 Drawing Sheets

(56) References Cited

U.S. PATENT DOCUMENTS

| | | | |
|---|---|---|---|
| 3,366,920 A | 1/1968 | Clair et al. | |
| 3,379,896 A | 4/1968 | Wolfe | |
| 3,605,236 A | 9/1971 | Bouckaert | |
| 3,621,193 A | 11/1971 | Banta | |
| 3,962,562 A | 6/1976 | Carter et al. | |
| 4,388,515 A | 6/1983 | Mathews | |
| 6,326,580 B1* | 12/2001 | Hiiro | B23K 11/241 219/91.21 |
| 9,413,115 B1 | 8/2016 | Henry | |
| 2001/0027962 A1* | 10/2001 | Moro | B23K 20/023 219/85.1 |
| 2002/0071293 A1* | 6/2002 | Eden | H02M 3/33507 257/E23.079 |
| 2004/0073319 A1* | 4/2004 | Monari | G05B 13/042 700/1 |
| 2009/0264002 A1 | 10/2009 | Bright et al. | |
| 2012/0043818 A1* | 2/2012 | Stratakos | H03K 17/145 307/77 |

FOREIGN PATENT DOCUMENTS

| | | |
|---|---|---|
| CN | 1256655 A | 6/2000 |
| CN | 102177616 A | 9/2011 |
| CN | 102754285 A | 10/2012 |
| CN | 202741914 U | 2/2013 |
| CN | 103008865 A | 4/2013 |
| CN | 106159571 A | 11/2016 |
| CN | 107204537 A | 9/2017 |
| CN | 107534392 A | 1/2018 |
| CN | 107635712 A | 1/2018 |
| DE | 9204968 U1 | 8/1992 |
| EP | 2843774 A1 | 3/2015 |
| EP | 3107155 A1 | 12/2016 |
| GB | 2066591 A | 7/1981 |
| JP | S4953552 A | 5/1974 |
| JP | H1154905 A | 2/1999 |
| JP | 2001259859 A | 9/2001 |
| JP | 2003071560 A | 3/2003 |
| KR | 20010092698 A | 10/2001 |
| KR | 20040056238 A | 6/2004 |
| NL | 8503353 A | 7/1987 |

OTHER PUBLICATIONS

European Search Report for Appl. No. 19180542.3 dated Feb. 11, 2020.
Japanese Office Action for JP Application No. 2019113299, dated Jan. 4, 2022, 6 pages.
Notice of Decision to Grant for Korean Application No. 10-2019-0071644, dated Jan. 24, 2021, 2 pages.
"Communication Pursuant to Article 94(3) EPC received for European Patent Application No. 21165445.4, dated Jul. 12, 2022", 4 pages.
"Extended European Search Report Received dated Aug. 12, 2021", dated Aug. 12, 2021, 8 pages.
Jiang, Huashan, "Factory practical automatic control", 4 Pages.
Chinese Office Action for Chinese Application No. 202111115027.1, dated Aug. 24, 2022, 16 pages.

* cited by examiner

RESISTANCE SOLDERING SYSTEM

CROSS REFERENCE TO RELATED APPLICATION

This application is a continuation application and claims the benefit of co pending U.S. patent application Ser. No. 16/012,919 filed Jun. 20, 2018, the entire disclosure of each of which is hereby incorporated herein by reference.

TECHNICAL FIELD OF INVENTION

This disclosure generally relates to a soldering system, and more particularly relates to a resistance soldering system.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well known methods, procedures, components, circuits, and networks have not been described in detail so as not to unnecessarily obscure aspects of the embodiments.

Figure 1:
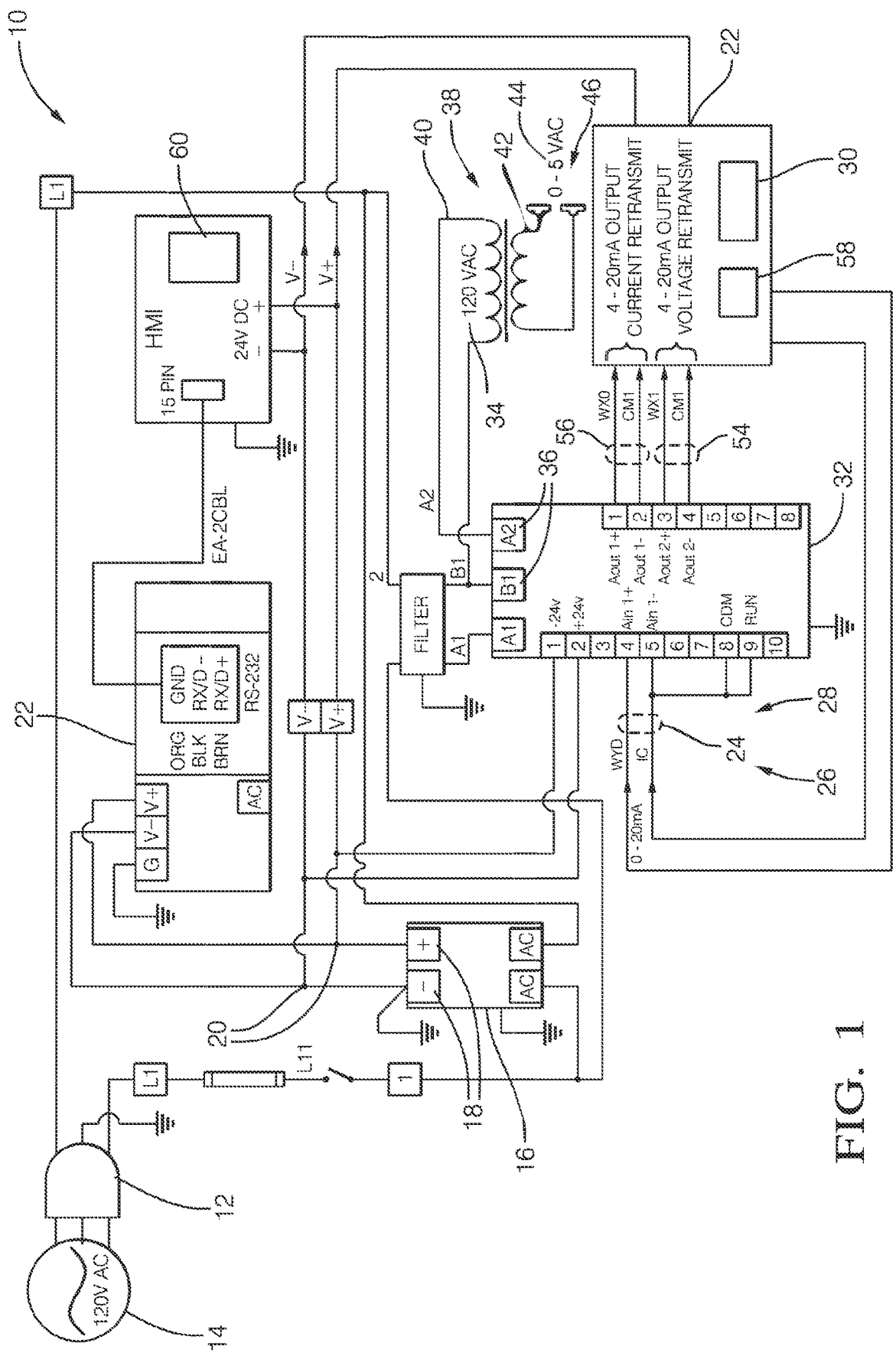
FIG. 1 is a schematic diagram of a resistance soldering system in accordance with one embodiment.

FIG. 1 illustrates a resistance soldering system 10, hereafter referred to as the system 10. As will be described in more detail herein, the system 10 is beneficial because the system 10 controls a power delivered to a solder joint (not shown) for a specified time to melt the solder joint. The system 10 includes a power input channel 12 receiving an alternating current 14 from a power source (e.g., a power receptacle connected to a power grid not shown). The power source may be any power source, and in the example illustrated in FIG. 1 is a 120-volt AC (120 VAC) power source.

The system 10 also includes an AC to DC converter 16 (AC/DC converter 16) in electrical communication with the power input channel 12. The AC/DC converter 16 converts a portion of the alternating current 14 to a direct current 18 at a converter output 20. The AC/DC converter 16 may be any type of AC/DC converter, and in the example illustrated in FIG. 1 generates an output voltage of about 24 VDC.

The system 10 also includes one or more controller circuits 22 in electrical communication with the converter output 20. The one or more controller circuits 22 control a signal 24 indicative of a desired power level 26 delivered for a desired time 28. In the example illustrated in FIG. 1, the signal 24 is a current signal in a range of 0 mA to 20 mA. In another embodiment (not shown), the signal 24 a voltage signal. The one or more controller circuits 22 may include a processor (not shown) such as a microprocessor or other control circuitry such as analog and/or digital control circuitry including an application specific integrated circuit (ASIC) for processing data as should be evident to those in the art. The one or more controller circuits 22 include a memory 30, including nonvolatile memory, such as electrically erasable programmable read only memory (EEPROM) for storing one or more routines, thresholds, and captured data. The one or more routines may be executed by the processors to perform steps for controlling the signal 24 as described above. The one or more controller circuits 22 may be distributed throughout the system 10 and communicate with one another through a wiring harness (not specifically shown) or may be housed in a common enclosure. As will be appreciated, the one or more controller circuits 22 may be separate circuitry, be the same circuitry, subsystems of one another, or any combination thereof. As also will be appreciated, the functions performed by the one or more controller circuits 22 may be handled by each individual controller circuit 22 or distributed between them, e.g., load balancing.

The system 10 also includes a silicon-controlled rectifier 32 (SCR 32) in electrical communication with the power input channel 12, the converter output 20, and the signal 24. The SCR 32 controls an SCR output voltage 34 to a SCR output channel 36, wherein the SCR output voltage 34 is proportional to the signal 24. The SCR 32 may be any phase angle operated SCR 32 suitable for the application. One such SCR 32 is the UF1HXTE0 08 PIR0Z manufactured by Control Concepts, Inc. of Chanhassen, Minnesota, USA. In the example illustrated in FIG. 1, the SCR output voltage 34 is 0 VAC to 120 VAC.

The system 10 also includes a transformer 38 having a primary side 40 and a secondary side 42. The primary side 40 is in electrical communication with the SCR output channel 36 and receives the 0 VAC to 120 VAC potential from the SCR 32 as described above. The transformer 38 reduces (i.e., steps down) the SCR output voltage 34 from the primary side 40 (e.g., 120 VAC) to a secondary voltage 44 on the secondary side 42. The transformer 38 may be any transformer 38 that reduces the SCR output voltage 34, and in the example illustrated in FIG. 1, reduces the SCR output voltage 34 to a range of 0 VAC to about 5 VAC.

The system 10 also includes a pair of output leads 46 in electrical communication with poles of the secondary side 42 of the transformer 38. The pair of output leads 46 are configured to apply the secondary voltage 44 to the solder joint disposed between the pair of output leads 46. The pair of output leads 46 may terminate at corresponding electrodes (not shown) that contact the solder joint and are preferably formed of a carbon-based material, such as graphite.

Figure 2A:
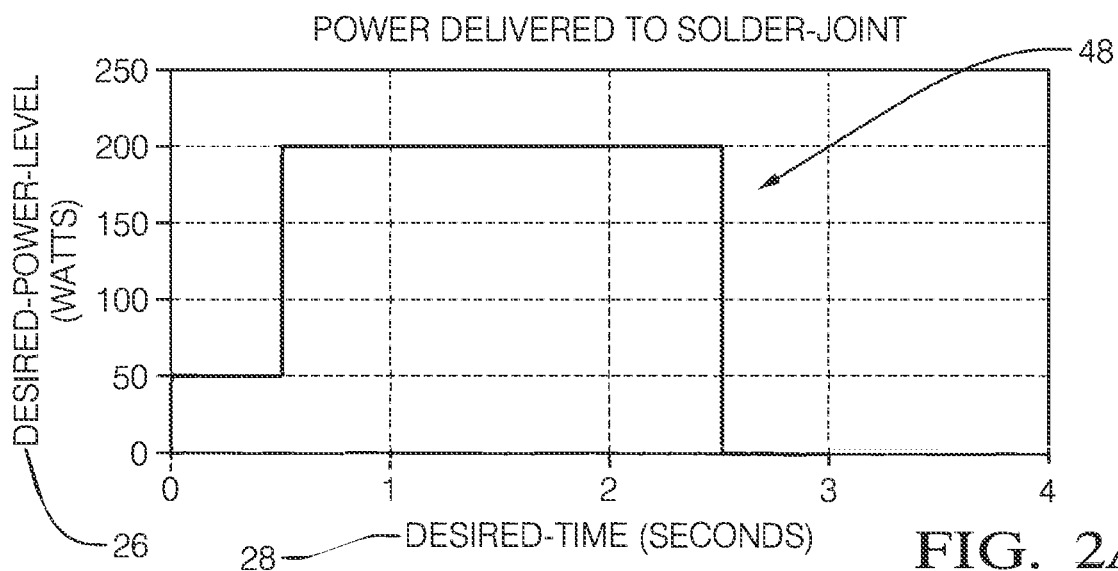
FIG. 2A is a graph illustrating a power delivered over time by the resistance soldering system of FIG. 1 in accordance with one embodiment.
Figure 2B:
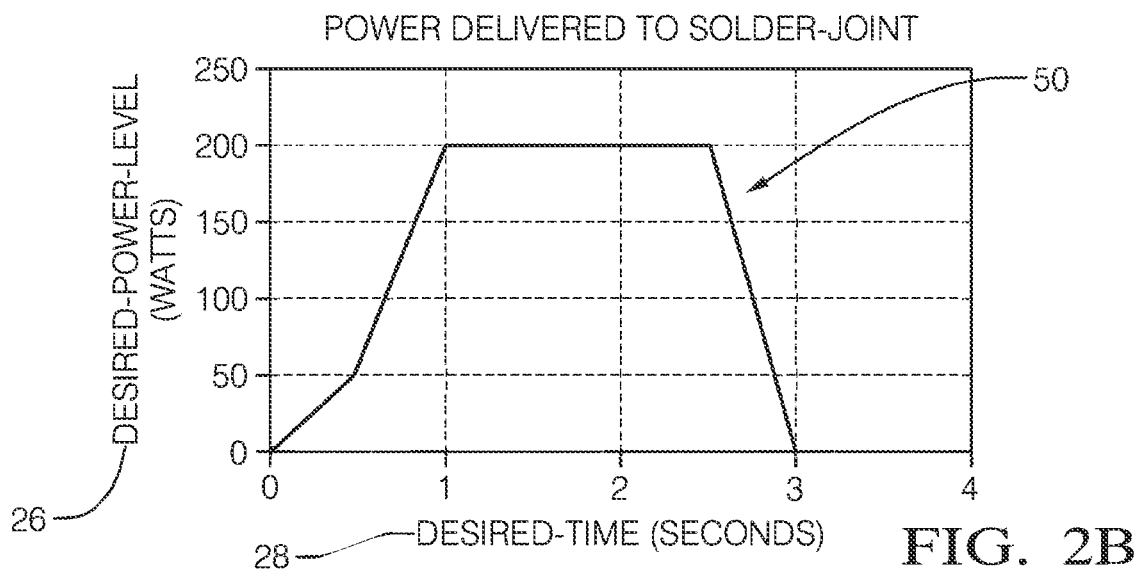
FIG. 2B is another plot illustrating the power delivered over time by the resistance soldering system of FIG. 1 in accordance with one embodiment.
Figure 2C:
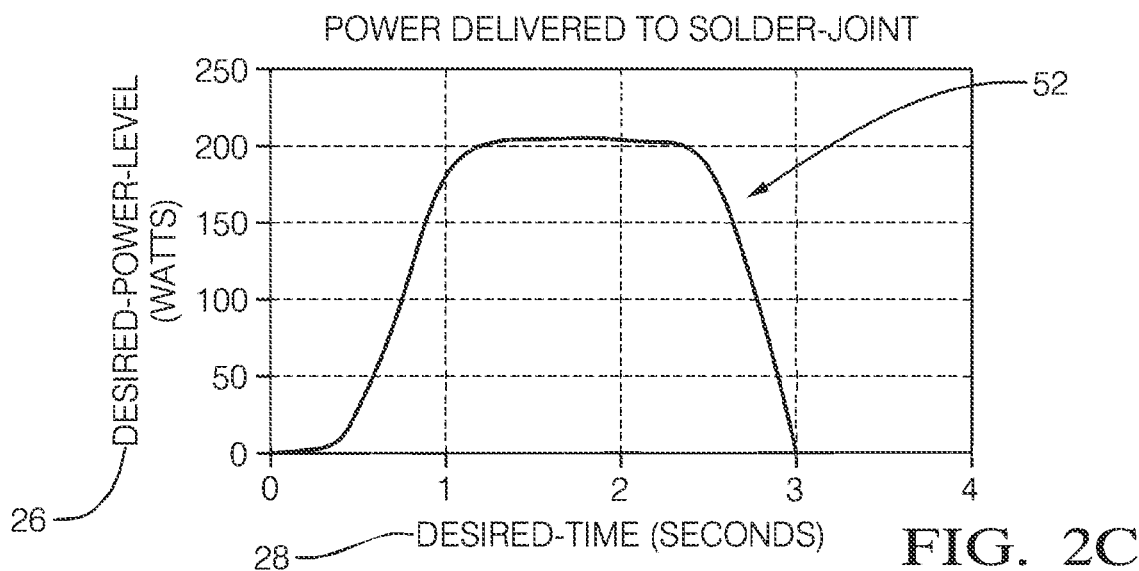
FIG. 2C is yet another plot illustrating the power delivered over time by the resistance soldering system of FIG. 1 in accordance with one embodiment.

FIGS. 2A 2C are plots illustrating examples of the desired power level 26 applied to the solder joint for the desired time 28. The one or more controller circuits 22 determine the signal 24 applied to the SCR 32 required to melt the solder joint based on the desired power level 26 and the desired time 28, thereby melting the solder joint disposed between the pair of output leads 46. It will be appreciated that the total energy applied to the solder joint is indicated by an area beneath the curves of each plot, and in the examples illustrated in FIGS. 2A 2C has units of Watt seconds (W s). The one or more controller circuits 22 may be programmed with specific ramp rates and/or dwell times based on characteristics of the solder joint including geometric dimensions, solder alloy composition, and materials being joined by the solder. The one or more controller circuits 22 controls the desired power level 26 independent of the desired time 28. This contrasts with prior art resistance soldering systems that typically require a total energy input be commanded, wherein the time to deliver the energy varies based on a quality of the electrical connection between the contacts and the solder joint. The system 10 is an improvement over prior art resistance soldering systems because the system 10 adds another degree of freedom to the resistance soldering process, i.e., the desired time 28. Accordingly, the one or more controller circuits 22 controls the desired time 28 independent of the desired power level 26. As illustrated in FIGS. 2A 2B, the desired power level 26 is characterized by a linear function 48 and/or a piece wise linear function 50. As illustrated in FIG. 2C, the desired power level 26 is characterized by a polynomial function 52. Soldering profiles containing the desired power level 26 and the desired time 28 are user defined and based on the characteristics of the solder joint as described above.

Referring to FIG. 1, the SCR 32 further includes a voltage output signal 54 and a current output signal 56 in electrical communication with the one or more controller circuits 22. The voltage output signal 54 and the current output signal 56 are indicative of a total power delivered 58 to the primary side 40 of the transformer 38. That is, the voltage output signal 54 and the current output signal 56 are scaled by the one or more controller circuits 22 to determine the total power delivered 58 to the primary side 40 of the transformer 38, and both are characterized by electrical currents in the range of 4 mA to 20 mA. The one or more controller circuits 22 determine the total power delivered 58 to the pair of output leads 46 based on the voltage output signal 54 and the current output signal 56 and may also consider any electrical efficiency losses through the transformer 38 and/or wiring. The system 10 stores the voltage output signal 54 and the current output signal 56 in the memory 30 of the one or more controller circuits 22 for historical purposes and may be accessed by an operator.

The system 10 also includes a visual display 60 that is a component of a human machine interface (HMI—not specifically shown). The voltage output signal 54 and the current output signal 56 are displayed on the visual display 60 for viewing by the operator and may be used for quality control purposes.

Figure 3:
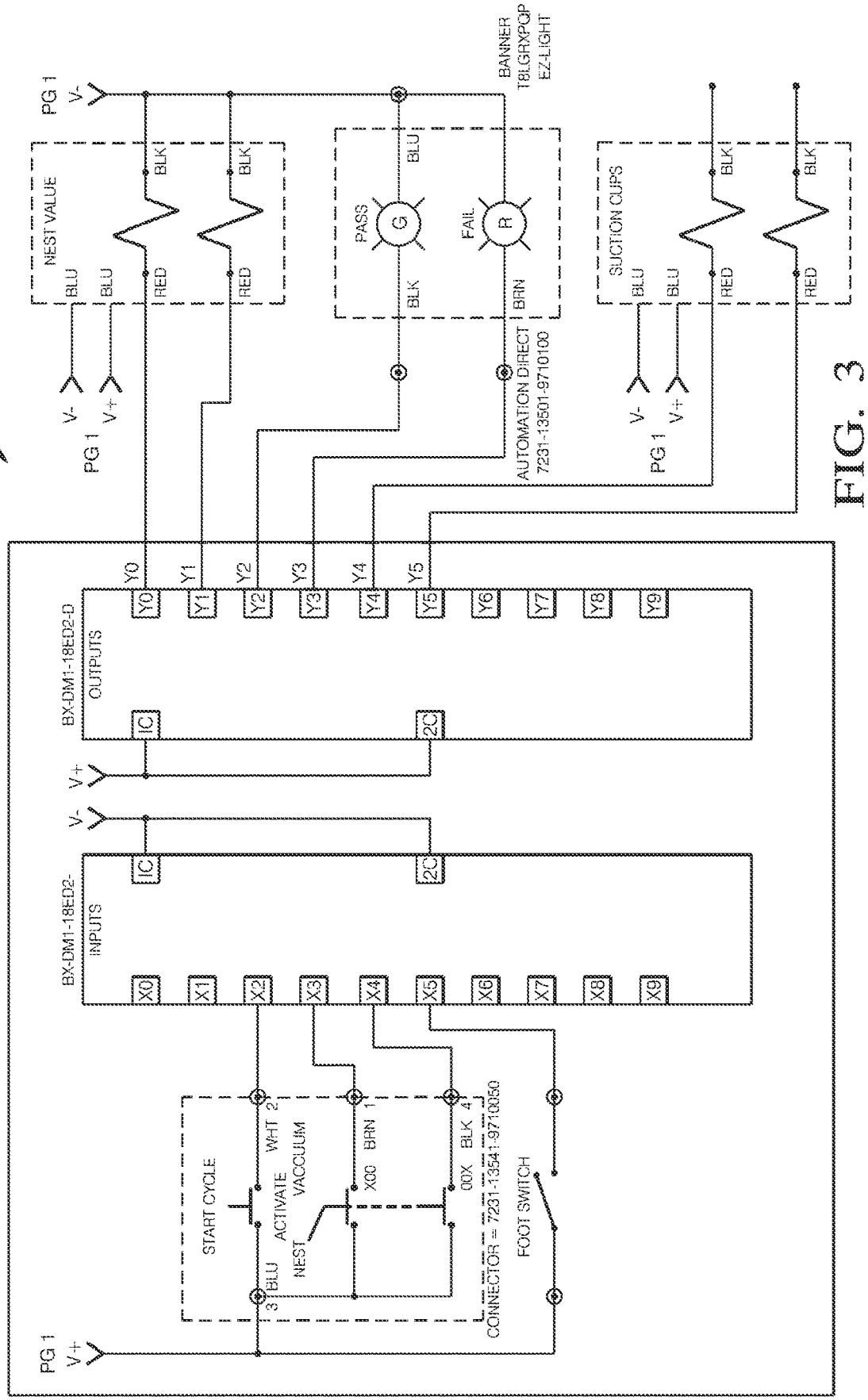
FIG. 3 is a schematic diagram of a controller circuit of the resistance soldering system of FIG. 1 in accordance with one embodiment.
Figure 4:
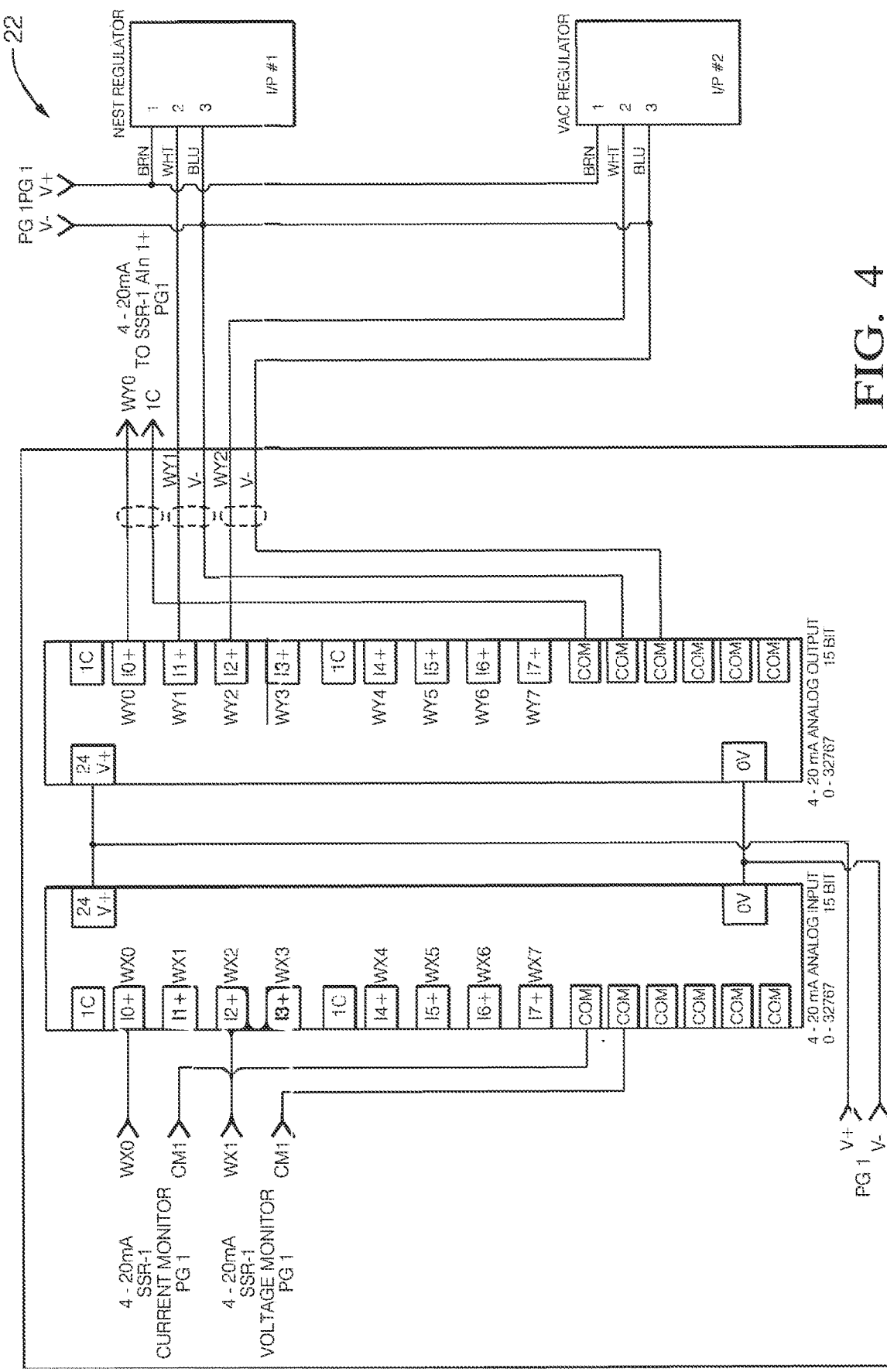
FIG. 4 is a schematic diagram of another controller circuit of the resistance soldering system of FIG. 1 in accordance with a different embodiment.

FIGS. 3 4 illustrate additional details of the one or more controller circuits that are used in the system 10.

Figure 5:
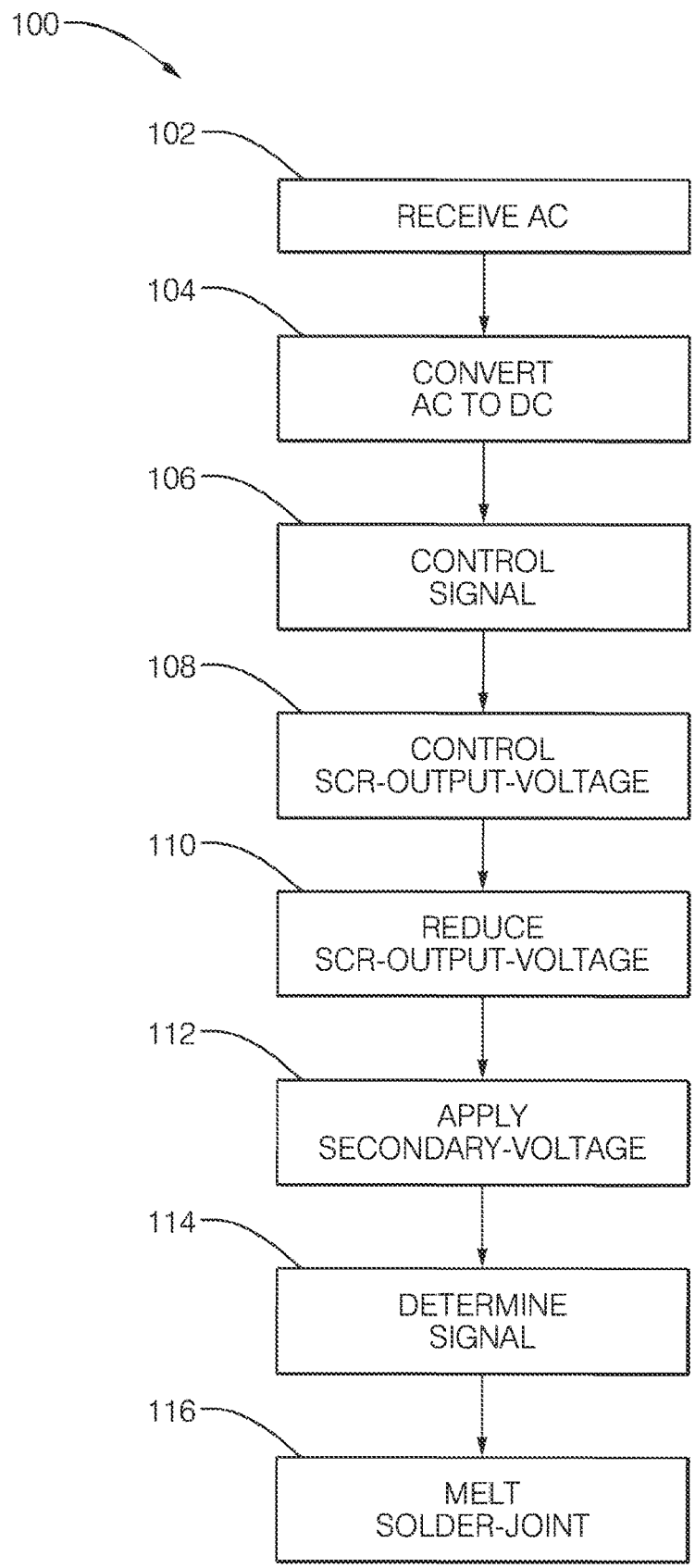
FIG. 5 is a flow chart illustrating a method of operating the resistance soldering system of FIG. 1 in accordance with another embodiment.

FIG. 5 is a flow chart illustrating another embodiment of a method 100 of operating a resistance soldering system 10, hereafter referred to as the system 10.

Step 102, RECEIVE AC, includes receiving an alternating current 14 from a power source with a power input channel 12 as described above and illustrated in FIG. 1.

Step 104, CONVERT AC TO DC, includes converting a portion of the alternating current 14 to a direct current 18 at a converter output 20 with an AC to DC converter 16 (AC/DC converter 16) in electrical communication with the power input channel 12 as described above and illustrated in FIG. 1.

Step 106, CONTROL SIGNAL, includes controlling a signal 24 indicative of a desired power level 26 delivered for a desired time 28 with one or more controller circuits 22 in electrical communication with the converter output 20. In the example illustrated in FIG. 1, the signal 24 is a current signal in a range of 0 mA to 20 mA, and in another embodiment (not shown), the signal 24 is a voltage signal. The one or more controller circuits 22 controls the desired power level 26 independent of the desired time 28 and controls the desired time 28 independent of the desired power level 26.

Step 108, CONTROL SCR OUTPUT VOLTAGE, includes controlling an SCR output voltage 34 to a SCR output channel 36 proportional to the signal 24 with a silicon-controlled rectifier 32 (SCR 32) as described above. In the example illustrated in FIG. 1, the SCR output voltage 34 is 0 VAC to 120 VAC. The SCR 32 further includes a voltage output signal 54 and a current output signal 56 that are indicative of a total power delivered 58 to a primary side 40 of a transformer 38, as described above and illustrated in FIG. 1.

Step 110, REDUCE SCR OUTPUT VOLTAGE, includes reducing, with the transformer 38 the SCR output voltage 34 from the primary side 40 to a secondary voltage 44 on a secondary side 42 of the transformer 38 as described above. The transformer 38 may be any transformer 38 that reduces the SCR output voltage 34, and preferably reduces the SCR output voltage 34 to a range of 0 VAC to about 5 VAC as described above.

Step 112, APPLY SECONDARY VOLTAGE, includes applying, with a pair of output leads 46 in electrical communication with poles of the secondary side 42 of the transformer 38, the secondary voltage 44 to a solder joint disposed between the pair of output leads 46. The pair of output leads 46 may terminate at corresponding electrodes that contact the solder joint and are preferably formed of a carbon-based material, such as graphite.

Step 114, DETERMINE SIGNAL, includes determining, with the one or more controller circuits 22, the signal 24 applied to the SCR 32 required to melt the solder joint based on the desired power level 26 and the desired time 28. FIGS. 2A 2B, illustrate the desired power level 26 characterized by a linear function 48 and/or a piece wise linear function 50. As illustrated in FIG. 2C, the desired power level 26 is characterized by a polynomial function 52. The voltage output signal 54 and the current output signal 56 that are indicative of the total power delivered 58 to the primary side 40 of the transformer 38 are stored in a memory 30 of the one or more controller circuits 22 as described above. The voltage output signal 54 and the current output signal 56 are displayed on a visual display 60 for viewing by an operator and may be used for quality control purposes, as described above.

Step 116, MELT SOLDER JOINT, includes melting the solder joint disposed between the pair of output leads 46 with the secondary voltage 44 as described above.

Accordingly, a resistance soldering system 10 (the system 10) and a method 100 of operating the system 10 are provided. The system 10 is an improvement over prior art resistance soldering systems because the system 10 controls the desired power level 26 independent of the desired time 28.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A resistance soldering system, comprising:
   a power input channel configured to receive an alternating current from a power source;
   a controller circuit configured to generate a control signal indicative of a desired power level delivered for a desired time;
   a silicon-controlled rectifier electrically connected to the power input channel and the controller circuit and configured to produce a control voltage proportional to the control signal; and
   a transformer having a primary side configured to receive the control voltage from the silicon-controlled rectifier and a secondary side having output leads configured to apply an output voltage across a solder joint disposed between the output leads, wherein electrical resistance of the solder joint to the output voltage melts the solder joint disposed between the pair of output leads, wherein the controller circuit determines the control signal applied to the silicon controlled rectifier required to melt the solder joint based on the desired power level and the desired time, and wherein the controller circuit controls the desired power level independent of the desired time.

2. The system in accordance with claim 1, wherein the control signal is a current signal.

3. The system in accordance with claim 1, wherein the signal is a control voltage signal.

4. The system in accordance with claim 1, wherein the silicon-controlled rectifier receives a voltage output signal and a current output signal from the controller circuit, the voltage output signal and the current output signal indicative of a total power delivered to the primary side of the transformer, whereby the controller circuit determines the total power delivered to a pair of output leads based on the voltage output signal and the current output signal.

5. The system in accordance with claim 4, wherein the voltage output signal and the current output signal are stored in a memory of the controller circuit.

6. The system in accordance with claim 4, wherein the system further includes a visual display and wherein the voltage output signal and the current output signal are displayed on the visual display.

7. The system in accordance with claim 1, wherein the desired power level is characterized as a linear function.

8. The system in accordance with claim 7, wherein the linear function is further characterized as a piece-wise linear function.

9. The system in accordance with claim 1, wherein the desired power level is characterized as a polynomial function.

10. A method of operating a resistance soldering system, comprising:
    receiving an alternating current from a power input channel connected to a power source;
    generating a control signal indicative of a desired power level delivered for a desired time via a controller circuit;
    producing a control voltage proportional to the control signal via a silicon-controlled rectifier electrically connected to the power source and the controller circuit;
    producing an output voltage from a transformer having a primary side and a secondary side as the primary side receives the control voltage from the silicon-controlled rectifier;
    applying the output voltage across a solder joint disposed between output leads electrically connected to the secondary side, wherein electrical resistance of the solder joint to the output voltage melts the solder joint disposed between the pair of output leads; and
    determining, via the controller circuit, the control signal applied to the silicon-controlled rectifier required to melt the solder joint based on the desired power level and the desired time, wherein the controller circuit controls the desired time independent of the desired power level.

11. The method in accordance with claim 10, wherein the control signal is a current signal.

12. The method in accordance with claim 10, wherein the control signal is a voltage signal.

13. The method in accordance with claim 12, wherein the silicon-controlled rectifier receives a voltage output signal and a current output signal from the controller circuit, wherein the voltage output signal and the current output signal are indicative of a total power delivered to the primary side of the transformer, and wherein the method further includes:

determining the total power delivered to a pair of output leads based on the voltage output signal and the current output signal via the controller circuit.

14. The method in accordance with claim 13, further including storing the voltage output signal and the current output signal in a memory of the controller circuit.

15. The method in accordance with claim 13, wherein the method further includes:

providing a visual display; and displaying the voltage output signal and the current output signal on the visual display.

16. The method in accordance with claim 10, wherein the desired power level is characterized as a linear function.

17. The method in accordance with claim 16, wherein the linear function is further characterized as a piece wise linear function.

18. The method in accordance with claim 10, wherein the desired power level is characterized as a polynomial function.

* * * * *